(12) United States Patent
Hamasaki

(10) Patent No.: US 8,819,894 B2
(45) Date of Patent: Sep. 2, 2014

(54) CASTER FOR AN IMAGE FORMING APPARATUS

(71) Applicant: Canon Kabushiki Kaisha, Tokyo (JP)

(72) Inventor: Ryuji Hamasaki, Zhongshan (CN)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/088,863

(22) Filed: Nov. 25, 2013

(65) Prior Publication Data

US 2014/0143982 A1  May 29, 2014

(30) Foreign Application Priority Data

Nov. 29, 2012  (JP) .................................. 2012-261191

(51) Int. Cl.
*B60B 33/00* (2006.01)
(52) U.S. Cl.
USPC ............................................................ 16/35 R
(58) Field of Classification Search
USPC .......... 16/35 R, 35 D, 37, 38, 31 R; 188/1.12, 188/30, 31; 280/5.2, 5.24, 5.26, 47.17, 280/5.22, 47.29, 47.38, 47.22, 642, 647, 280/650
See application file for complete search history.

(56) References Cited

U.S. PATENT DOCUMENTS

| 4,941,552 | A | * | 7/1990 | Screen | 188/1.12 |
| 5,134,915 | A | * | 8/1992 | Fukano et al. | 83/563 |
| 5,988,323 | A | * | 11/1999 | Chu | 188/1.12 |
| 6,360,851 | B1 | * | 3/2002 | Yang | 188/1.12 |
| 6,532,624 | B1 | * | 3/2003 | Yang | 16/35 R |
| 6,725,501 | B2 | * | 4/2004 | Harris et al. | 16/35 R |
| 6,810,560 | B1 | * | 11/2004 | Tsai | 16/35 R |
| 7,516,512 | B2 | * | 4/2009 | Tsai | 16/35 R |
| 7,546,908 | B2 | * | 6/2009 | Chang | 188/1.12 |
| 7,703,588 | B2 | * | 4/2010 | Chiang | 190/18 A |
| 7,707,686 | B2 | * | 5/2010 | Chou | 16/35 R |
| 7,861,370 | B2 | * | 1/2011 | Chu | 16/35 R |
| 7,930,802 | B2 | * | 4/2011 | Tsai | 16/35 R |

FOREIGN PATENT DOCUMENTS

| JP | H09-226952 A | 9/1997 |
| JP | 2005-278982 A | 10/2005 |
| JP | 2006-175984 A | 7/2006 |

* cited by examiner

*Primary Examiner* — Chuck Mah
(74) *Attorney, Agent, or Firm* — Canon USA Inc. IP Division

(57) ABSTRACT

A caster includes a retaining portion, a caster main body, a wheel rotatably retained by the caster main body, a first lock mechanism having a first engaged portion formed on the retaining portion and a first engaging portion to be engaged with the first engaged portion, a second lock mechanism having a second engaged portion formed on an inner peripheral surface of the wheel and a second engaging portion to be engaged with the second engaged portion, an operation lever for operating the first lock mechanism and the second lock mechanism, and an elastic member configured to enable the operation lever to move to a lock position allowing engagement of the first engaging portion with the first engaged portion even when the operation lever is operated in a state in which the second engaged portion and the second engaging portion are not in phase with each other.

6 Claims, 19 Drawing Sheets

CASTER FOR AN IMAGE FORMING APPARATUS

BACKGROUND OF THE INVENTION

1. Field of the Invention

The present invention relates to an image forming apparatus and, in particular, to a lock mechanism for a caster mounted to the bottom surface of an image forming apparatus.

2. Description of the Related Art

In an image forming apparatus such as a printer, a facsimile apparatus, and a copying machine, it is common practice to arrange in the lower portion of the apparatus a sheet feeding apparatus for supplying a sheet to an image forming portion of the image forming apparatus. As a result of the recent increase in the processing speed of an image forming apparatus, there is a demand for a large space for accommodating a large amount of sheets in the sheet feeding apparatus. When a sheet stacking portion for accommodating sheets increases in size, it becomes impossible to arrange the image forming apparatus on a table, so that the image forming apparatus is placed on the floor.

In order that the image forming apparatus placed on the floor may be allowed to easily move, a plurality of casters are mounted to the bottom surface of the image forming apparatus. Through the rotation of the wheels of the casters, it is possible for the user to move the image forming apparatus with a small force. However, when the wheels of the casters are always kept in a state in which they can rotate, it can happen that the image forming apparatus may be inadvertently allowed to move if, for example, an external force is applied or an earthquake or the like occurs. In view of this, at least a part of the casters is provided with a lock mechanism for locking the wheel. By locking the wheel by the lock mechanism after the image forming apparatus has been installed at a desired position, it is possible to fix the position of the image forming apparatus.

In a construction for locking the wheel, a lock lever is operated, and a protrusion provided on a lock member is caused to enter a plurality of recesses, holes, etc., formed in the wheel at equal peripheral intervals around a shaft on the inner side of the wheel, whereby the rotation of the wheel is stopped. Here, if the protrusion of the lock member and the recess of the wheel do not coincide with each other, it is impossible for the protrusion of the lock member to enter the recess, so that, when locking the wheel, it is necessary to rotate the wheel so as to set the protrusion of the lock member and a recess of the wheel in phase with each other.

In the case where the image forming apparatus is light in weight, when the lock lever is operated, it is possible to rotate the wheel with the force of the user. On the other hand, in the case where the image forming apparatus is heavy, it is rather difficult to generate through lock lever operation by the user a force large enough to overcome the friction between the wheel and the ground. Thus, in the case where the image forming apparatus is heavy, the user must directly rotate the wheel to match the protrusion of the lock member with the recess of the wheel, and then operate the lock lever to lock the wheel.

In this process, the protrusion of the lock member and the recess of the wheel are situated inside the wheel, so that they cannot be easily seen from the outside. Thus, when locking the wheel, the user appropriately rotates the wheel by hand to operate the lock lever. Since it is difficult to lock the wheel through a single rotational operation on the wheel, it is necessary to rotate the wheel several times to try the lock lever operation.

On the other hand, the caster is provided so as to be rotatable parallel to the bottom surface of the image forming apparatus, and, to achieve further stability in traveling, the rotation center of the caster and the grounding position of the wheel are deviated from each other. As a result, when the image forming apparatus is pushed, the caster rotates along the pushing direction, and the moving direction of the image forming apparatus and the rotational direction of the wheel coincide with each other, making it easier for the image forming apparatus to travel.

In this case, the caster grounding point changes depending on the rotation of the caster. Generally speaking, the caster position is so designed that the stability of the image forming apparatus in the installed state is secured independently of the rotational position of the caster. However, depending upon the caster position, there exist a most advantageous condition and a most disadvantageous condition with respect to stability.

That is, when the image forming apparatus receives an external force, the longer the horizontal distance between the grounding position of the caster provided on the side opposite the side where the force is received and the center-of-gravity position of the image forming apparatus, the more advantageous it is from the viewpoint of the stability of the image forming apparatus. On the other hand, the shorter the horizontal distance between the caster grounding position and the center-of-gravity position of the image forming apparatus, the more disadvantageous it is from the viewpoint of the stability of the image forming apparatus.

For example, when the image forming apparatus receives a pushing force from the outside, the caster rotates along the pushing direction. As a result, the caster faces the inner side of the apparatus, resulting in a short distance between the caster grounding position and the center-of-gravity position of the apparatus. That is, the caster is allowed to rotate to a more disadvantageous position as compared with the other, more stable rotational positions. Further, if the image forming apparatus is forcibly pushed with its wheels locked, each caster is allowed to rotate to a more disadvantageous position as compared with the other, more stable rotational positions.

In view of this, to lock such caster rotation, a construction is available in which it is not only possible to lock the caster wheel but also to lock the caster at an arbitrary rotational position through a single lever operation (See Japanese Patent Application Laid-Open No. 2005-278982). In this construction, a recessed engagement portion is provided in a support portion supporting the caster, and a protrusion provided on a lock member is engaged with the engagement portion, thereby locking the rotation of the caster. By thus locking the caster, it is possible to prevent the caster from rotating to a disadvantageous position as compared with the most stable position when the image forming apparatus is forcibly pushed, making it possible to achieve an improvement in terms of the safety of the image forming apparatus in the installed state.

Further, Japanese Patent Application Laid-Open No. 9-226952 and Japanese Patent Application Laid-Open No. 2006-175984 propose a caster lock mechanism in which it is not only possible to lock the wheel of the caster but also to lock the caster rotational position so as to cause it to face the outer side of the image forming apparatus. By thus restricting the caster rotational position to one where it faces the outer side of the image forming apparatus, it is possible to reliably lock the caster at an advantageous position in terms of safety.

In the image forming apparatus equipped with the conventional lock mechanism configured to simultaneously lock the wheel and lock the caster through a single lever operation, there may occur a case where the user strives to lock the wheel at a position where the recess inside the wheel and the protrusion of the lock member do not match each other. In this case, it is impossible to move the lever to the locking position even when the recessed engagement portion of the caster and the protrusion of the lock member match each other.

Thus, when performing lever operation, it is necessary for the user to simultaneously place in phase the protrusion of the lock member and the recess inside the wheel, and the protrusion of the lock member and the recessed engagement portion of the caster. However, it takes time and effort to simultaneously place in phase the protrusion of the lock member and the recess inside the wheel, and the protrusion of the lock member and the recessed engagement portion of the caster, resulting in deterioration in usability.

SUMMARY OF THE INVENTION

The present invention is directed to an image forming apparatus allowing caster locking even when wheel locking is not effected.

According to an aspect of the present invention, an image forming apparatus includes: an image forming apparatus main body; and a plurality of casters mounted to a bottom surface of the image forming apparatus main body so as to be rotatable parallel to the bottom surface, wherein at least one of the casters includes a retaining portion fixed to the bottom surface of the image forming apparatus main body, a caster main body rotatably retained by the retaining portion, a wheel rotatably retained by the caster main body, a first lock mechanism which is provided on a first engaged portion formed on the retaining portion and on the caster main body, which has a first engaging portion configured to be detachably engaged with the first engaged portion, and which is configured to fix the caster main body in position with the first engaging portion being engaged with the first engaged portion so as to be in phase with each other, a second lock mechanism which is provided on a second engaged portion formed on an inner peripheral surface of the wheel and on the caster main body, which has a second engaging portion configured to be detachably engaged with the second engaged portion, and which is configured to fix the wheel in position with the second engaging portion being engaged with the second engaged portion so as to be in phase with each other, an operation lever for fixing the caster main body in position by the first lock mechanism and releasing the fixation thereof and for fixing the wheel in position by the second lock mechanism and releasing the fixation thereof, and an elastic member which is provided between the operation lever and the second lock mechanism and which is configured to undergo deformation so as to enable the operation lever to move to a rotation lock position allowing engagement of the first engaging portion with the first engaged portion even when a fixing operation is performed on the operation lever in a state in which the second engaged portion and the second engaging portion are not in phase with each other.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
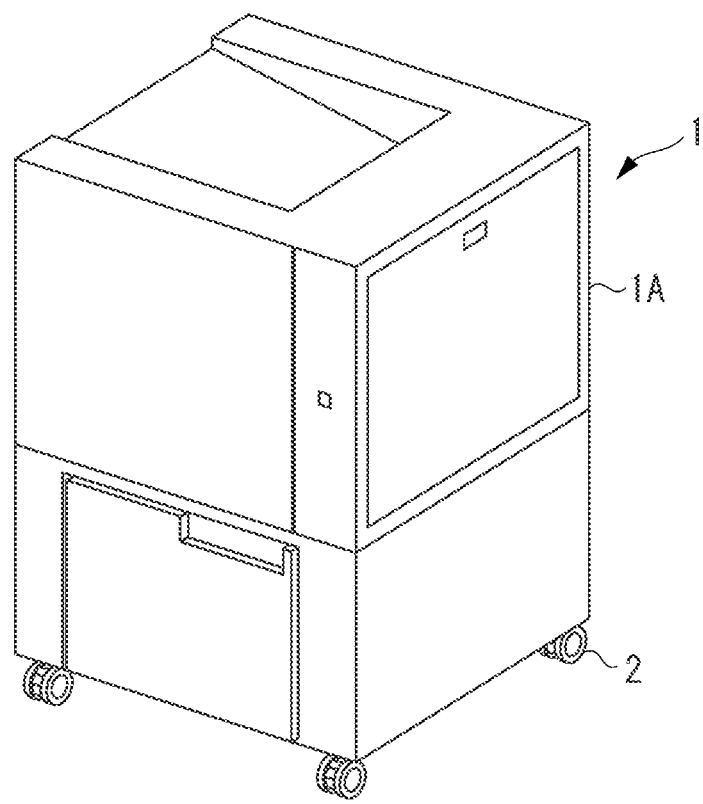
FIG. 1 is a perspective view of an image forming apparatus according to an exemplary embodiment of the present invention.

FIG. 1 is a perspective view of an image forming apparatus according to the present exemplary embodiment. FIG. 1 illustrates an image forming apparatus, in which an image forming portion or the like (not illustrated) 1A is arranged. Casters 2 are rotatably mounted to the four corners of the bottom surface of the image forming apparatus main body 1A.

Figure 2:
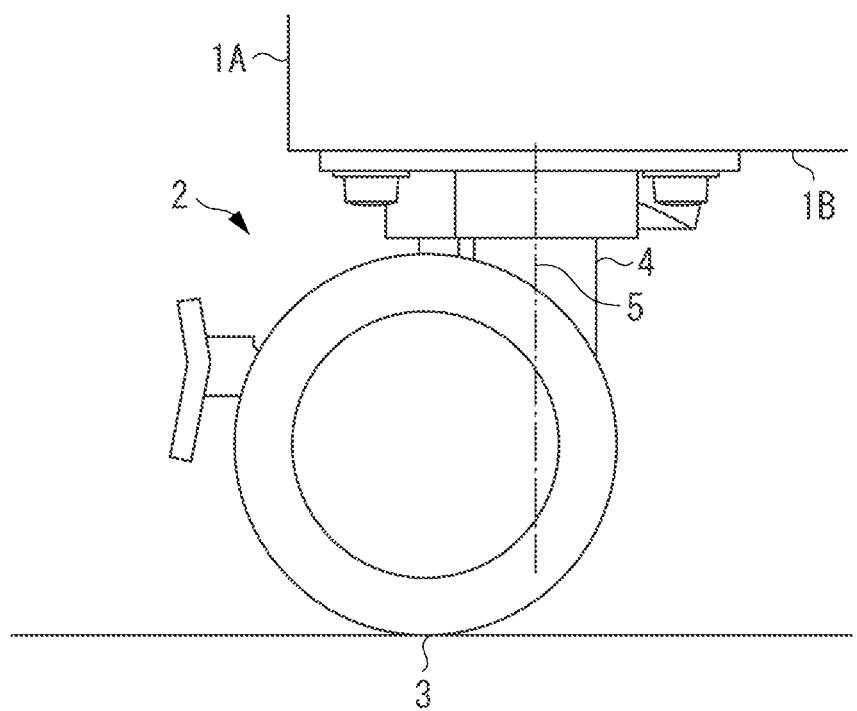
FIG. 2 illustrates one of the casters provided at the four corners of the bottom surface of the image forming apparatus of the image forming apparatus main body.
Figure 3A:
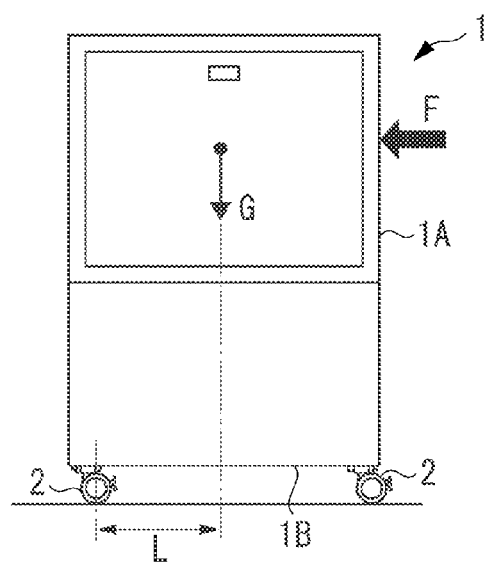
FIGS. 3A, 3B, and 3C are diagrams illustrating the horizontal distance from the center of gravity of the image forming apparatus main body to the grounding point of each caster which depends on the orientation of the caster.
Figure 3B:
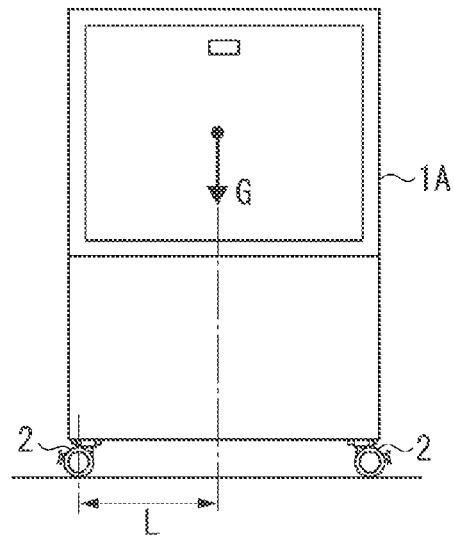

Here, each of the plurality of casters 2 provided on the image forming apparatus main body 1A rotates parallel to the bottom surface 1B of the image forming apparatus main body 1A using a rotation shaft 4 illustrated in FIG. 2 as a fulcrum, and is mounted to the bottom surface 1b such that the grounding point 3 of the caster 2 is deviated from the rotation shaft center 5 of the rotation shaft 3. As a result, as illustrated in FIG. 3A, the casters 2 rotate along the traveling direction of the image forming apparatus 1, making it possible to stabilize the traveling property of the image forming apparatus 1. FIG. 3B is a diagram illustrating a state in which two casters 2 opposite each other in the moving direction are oriented to the outer side of the image forming apparatus 1, and FIG. 3C is a diagram illustrating a state in which two casters 2 opposite each other are oriented in the inner side of the image forming apparatus 1.

Figure 3C:
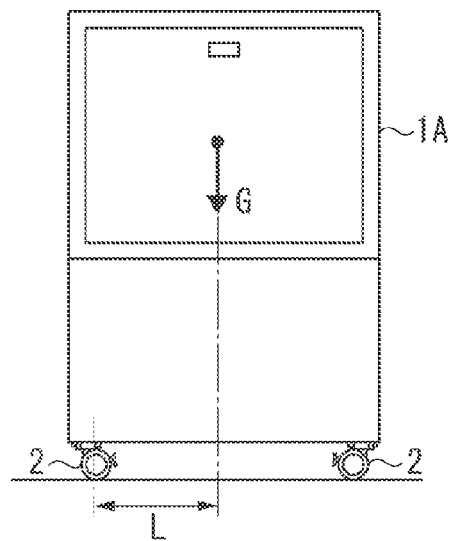

In FIGS. 3A to 3C, symbol L indicates the horizontal distance from the center of gravity G of the image forming apparatus main body 1A to the grounding point 3 of each caster 2. Since the grounding point 3 of each caster 2 is offset from the rotation shaft center 5, the horizontal distance L varies depending on the orientation of the caster 2. The longer the horizontal distance L, the more stable is the image forming apparatus 1 in the installed state.

Thus, in the case in which, as illustrated in FIG. 3B, the two casters opposite each other in the moving direction are both oriented to the outer side of the image forming apparatus 1, the horizontal distance L is the longest, and this case is most advantageous in terms of the safety of the image forming apparatus 1 in the installed state. On the other hand, in a case in which, as illustrated in FIG. 3A, the image forming apparatus 1 is pushed from one direction, e.g., the direction of the arrow F, with the rotation of the casters 2 unlocked, the casters 2 are rotated in the direction opposite the direction of the arrow F, i.e., toward the inner side of the apparatus. This results in a rather horizontal short distance L as seen from the direction in which the force is received, which is disadvantageous in terms of the safety of the image forming apparatus 1 in the installed state. FIG. 3C illustrates a state in which the two opposing casters 2 are rotated to the inner side of the image forming apparatus. In this state, the horizontal distance L is the shortest, which means a most disadvantageous condition from the viewpoint of the stability of the image forming apparatus 1 in the installed state.

Figure 4:
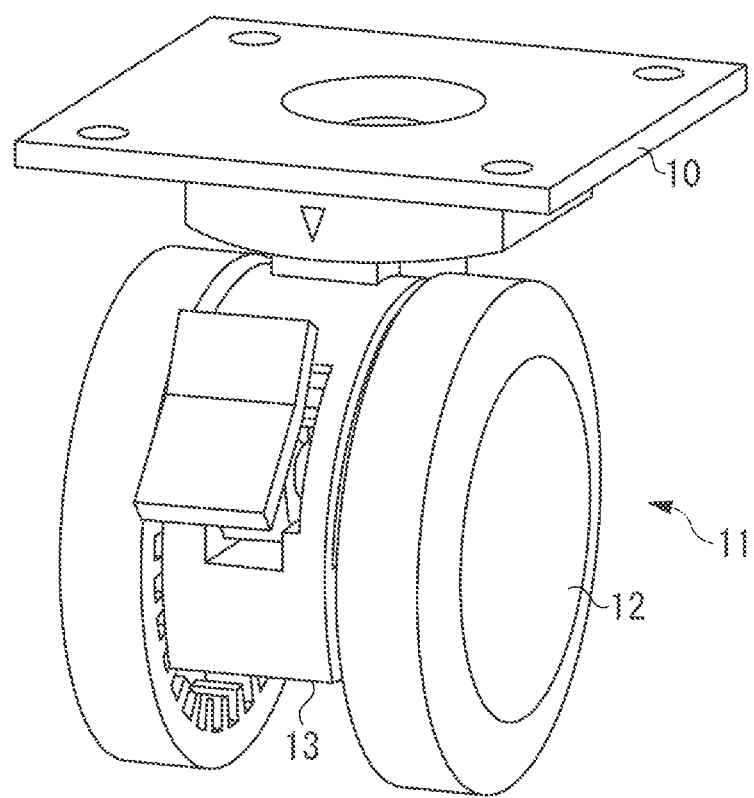
FIG. 4 is an explanatory view illustrating the construction of the caster.
Figure 5A:
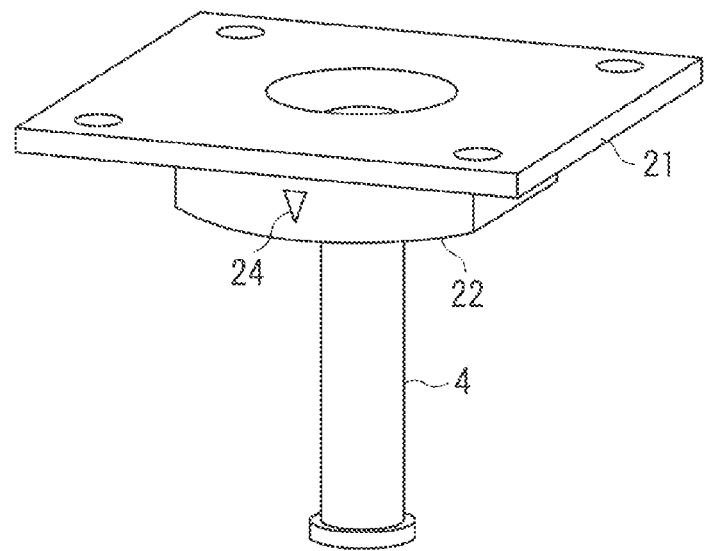
FIGS. 5A and 5B are diagrams illustrating a fixing portion of the caster.
Figure 5B:
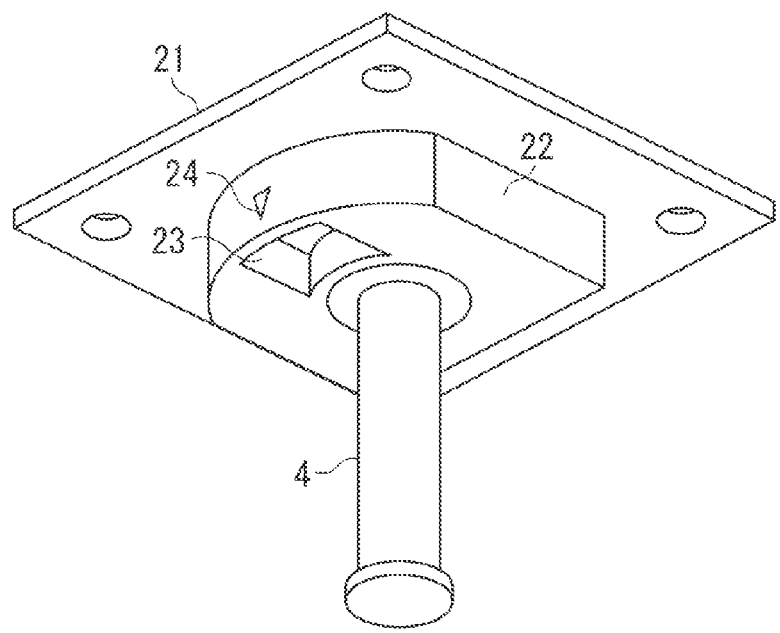

FIG. 4 is a diagram illustrating the construction of the caster 2. The caster 2 is equipped with a fixing portion 10 to be fixed to the bottom surface of the image forming apparatus main body 1A, and a rotating portion 11 configured to rotate with respect to the fixing portion 10 and constituting the caster main body. As illustrated in FIG. 5A, the fixing portion 10, which is a retaining portion for rotatably retaining the rotating portion 11, is equipped with a caster frame 21 to be mounted to the bottom surface of the image forming apparatus main body 1A, a rotation shaft 4 fixed to the caster frame 21, and a rotation lock reception member 22. As illustrated in FIG. 5B, the rotation lock reception member 22 is equipped with a rotation lock recess 23, which is a first engaged portion for effecting the rotation lock of the caster 2, and a triangular indicator, which is a display portion for indicating the existing position of the rotation lock recess 23.

Figure 6A:
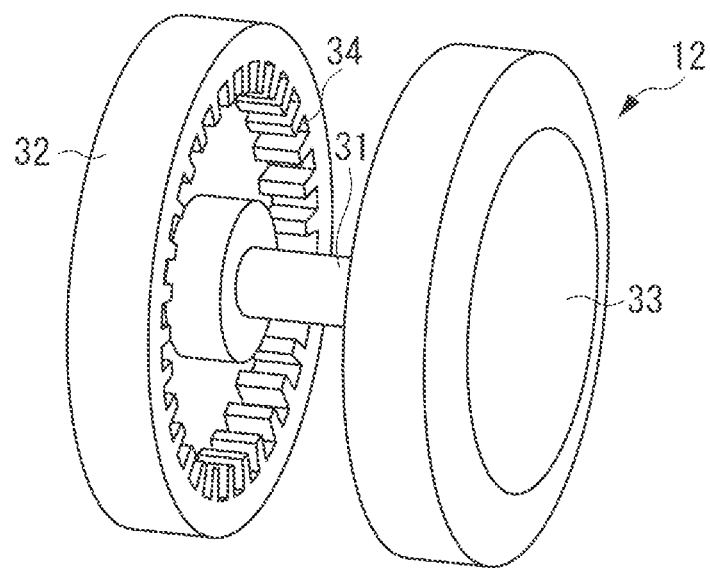
FIGS. 6A and 6B are diagrams illustrating the construction of a rotating portion of the caster.
Figure 6B:
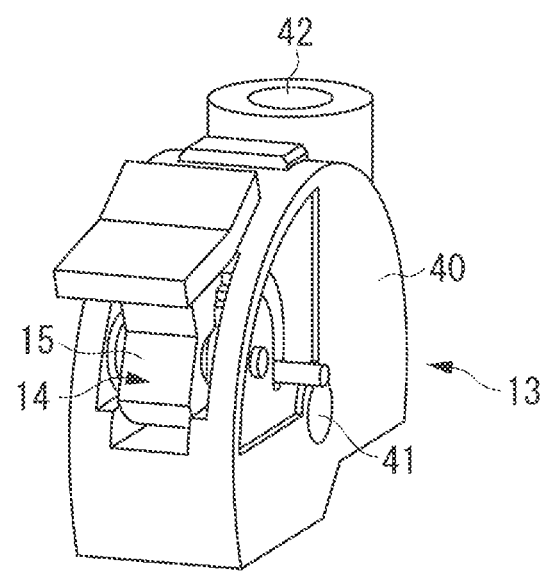

The rotating portion 11 is equipped with a wheel portion 12 illustrated in FIG. 6A, and a rotation base portion 13 illustrated in FIG. 6B. As illustrated in FIG. 6A, the wheel portion 12 is composed of an axle 31, a wheel 32, and a wheel cover 33, and the axle 31, the wheel 32, and the wheel cover 33 rotate integrally with respect to the rotation base portion 13 around the axle 31. The axle 31 is in a direction orthogonal to the rotation shaft 4, and the wheel 32 is equipped with wheel protrusions and recesses 34 of uniform configuration as the second engaged portion provided on an inner peripheral surface on the inner side of the outer periphery.

As illustrated in FIG. 6B, the rotation base portion 13 is equipped with a rotation lock mechanism 14 which is a first lock mechanism having a caster base 40, a rotation lock recess 23, a rotation lock member 16 serving as a first engaging portion described below, etc. The caster base 40 is equipped with an axle hole portion 41 for rotatably retaining the axle 31, and a rotation shaft hole portion 42 for rotatably retaining the caster base 40 with respect to the rotation shaft 4.

Figure 7A:
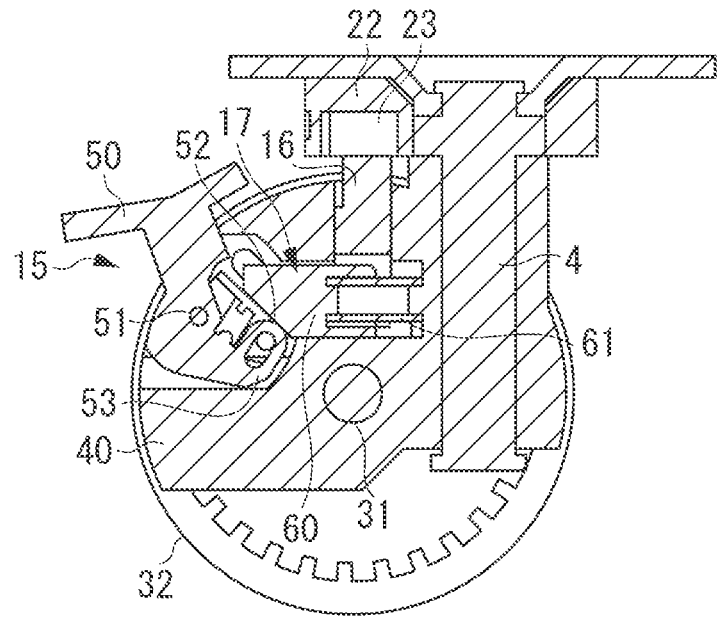
FIGS. 7A, 7B, and 7C are diagrams illustrating the construction of a lock mechanism provided in the caster.
Figure 7B:
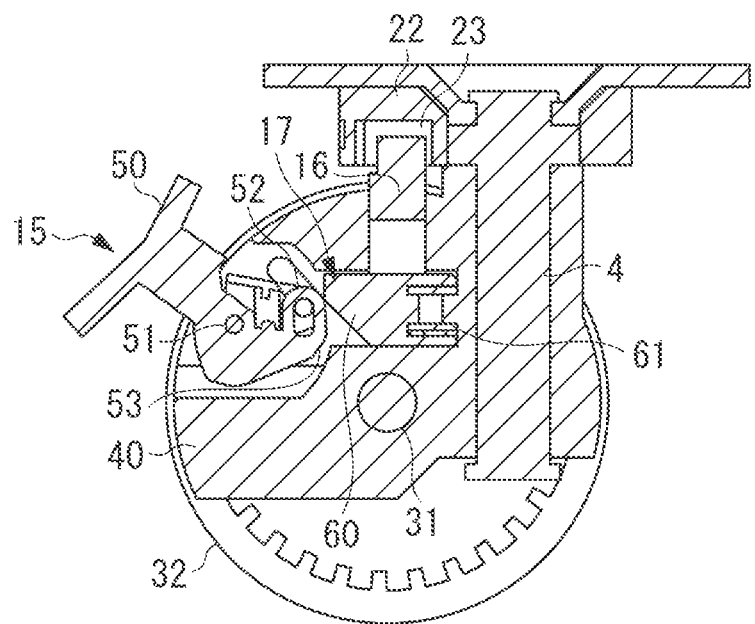
Figure 7C:
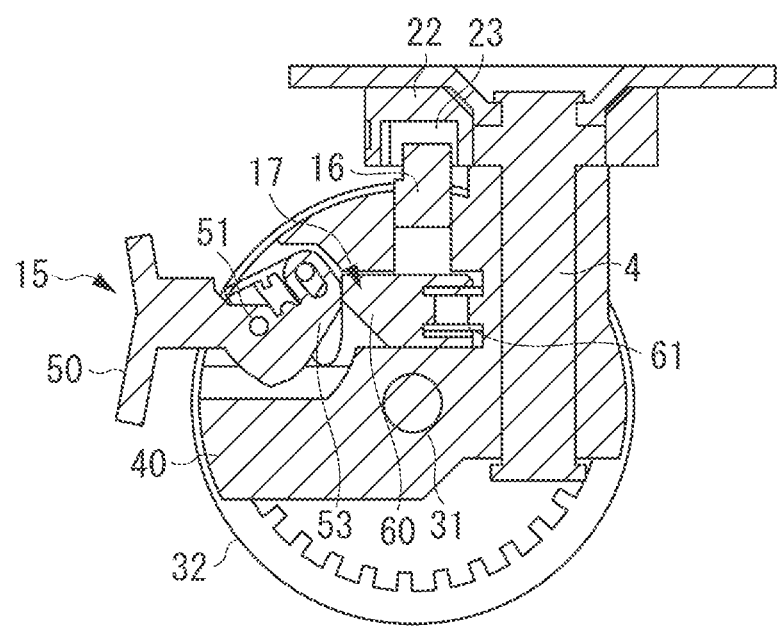

As illustrated in FIGS. 7A, 7B, and 7C, the rotation lock mechanism 14 is equipped with the rotation lock member 16, the rotation lock recess 23, and a link portion 17. The rotation lock mechanism 14 is configured to lock (fix) and lock-release (fixation-release) the rotating portion 11 through the operation of an operation lever portion 15. The operation lever portion 15 is equipped with an operation lever 50, and a rotation lock mechanism 18 which is a second lock mechanism having the wheel protrusions 34, a rotation lock base 54, etc. constituting the second engaging portion described below. Here, the operation lever 50 is retained so as to be swingable with respect to the caster base 40 around an operation lever rotation shaft 51, and a first contact surface 52 and a second contact surface 53 are formed on an inner swinging end portion thereof.

Figure 8A:
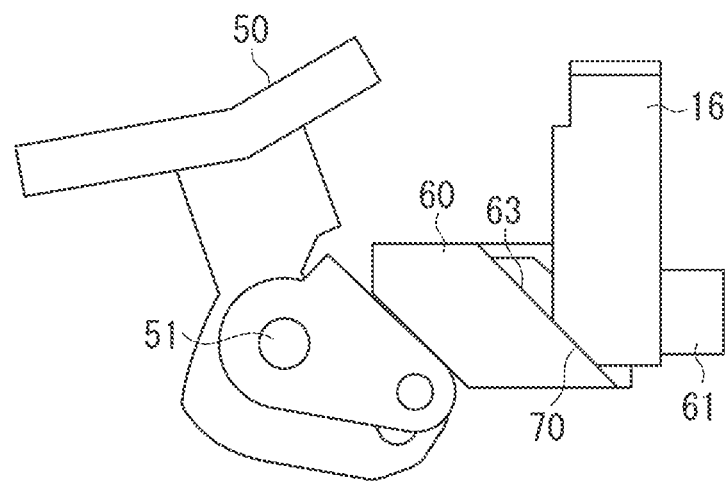
FIGS. 8A and 8B are diagrams illustrating the state in which the lock mechanism is not in the lock state.
Figure 8B:
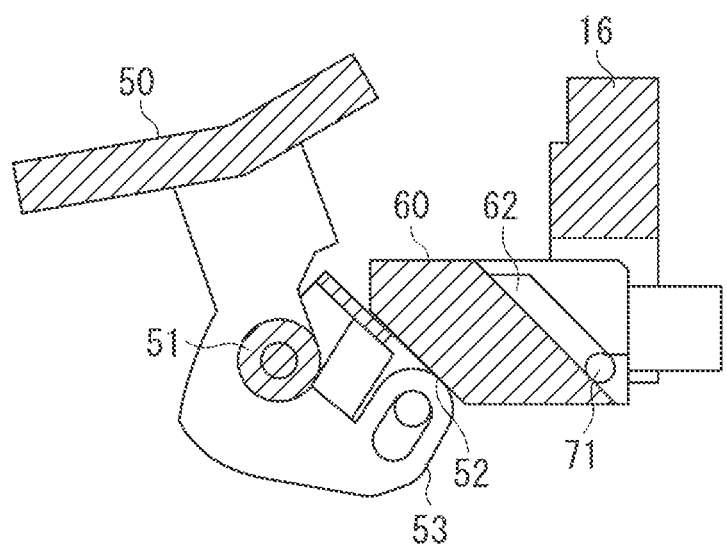

The link portion 17 is equipped with a link member 60, and a link spring 61 serving as an urging member, and the link member 60 is constantly pressed in the direction of the outer periphery by the link spring 61 to be brought into press contact with the first contact surface 52 and the second contact surface 53 of the operation lever 50. The rotation lock member 16 is equipped, at the lower end portion thereof, with a slope 70 illustrated in FIG. 8A described below, and a link shaft portion 71 illustrated in FIG. 8B described below. As illustrated in FIG. 8B, the link member 60 has an inclined link groove 62 to be engaged with the link shaft portion 71 of the rotation lock member 16.

FIG. 7A is a diagram illustrating the state in which the rotation lock mechanism 14 is not locked. As illustrated in FIG. 8A, in this state, the slope 70 of the rotation lock member 16 and the slope 60 of the link member 60 are held in contact with each other, and the link shaft portion 71 of the rotation lock member 16 is situated at the lower end portion of the link groove 62 of the link member 60.

On the other hand, when locking the caster 2, the operation lever 50 is pushed down as illustrated in FIG. 7B, and is swung counterclockwise using the operation lever rotation shaft 51 as a fulcrum. As a result, the link member 60 held in contact with the first contact surface 52 of the operation lever 50 is pushed-in inwardly by the operation lever 50 to move horizontally. With this, the rotation lock member 16 ascends while upwardly moving the link shaft portion 71 along the link groove 62 when the slope 70 is pushed by the slope 63 of the link member 60.

Figure 9A:
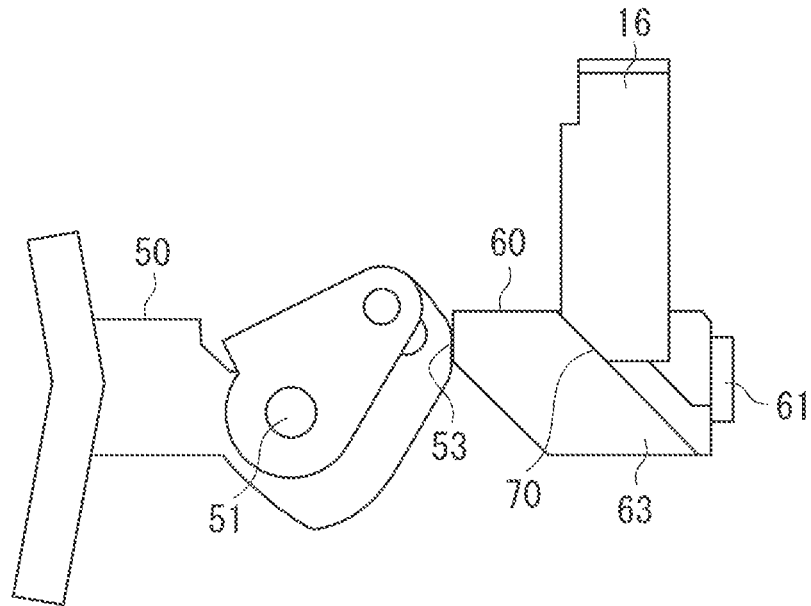
FIGS. 9A and 9B are diagrams illustrating the state in which the lock mechanism is in the lock state.
Figure 9B:
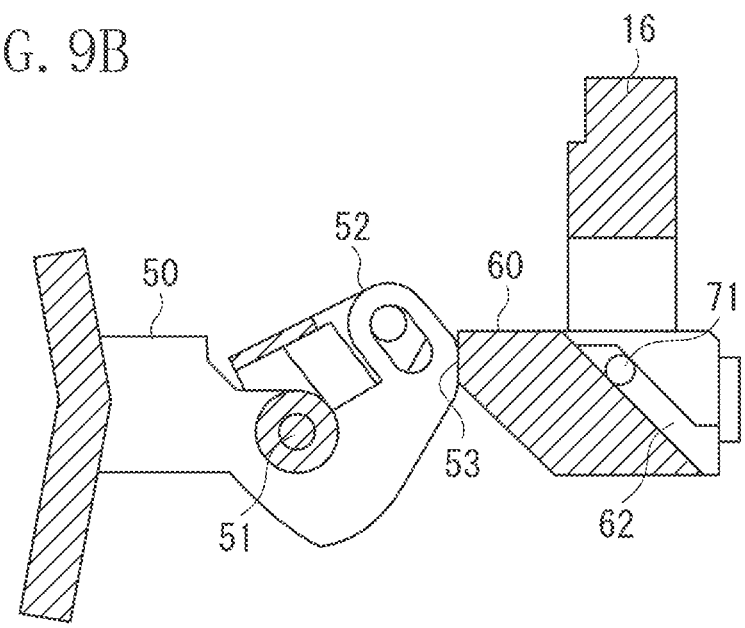

When the rotation lock member 16 thus ascends in conjunction with the lock operation (fixing operation) of the operation lever 50, the rotation lock member 16 is engaged with the rotation recess 23 of the rotation lock reception member 22 as illustrated in FIG. 7B, whereby the rotating portion 11 of the caster 2 is locked. After the rotation lock member 16 has been thus engaged with the rotation lock recess 23 of the rotation lock reception member 22, the operation lever 50 stops at a position where the second contact surface 53 is held in contact with the link member 60 as illustrated in FIGS. 9A and 9B.

Figure 10A:
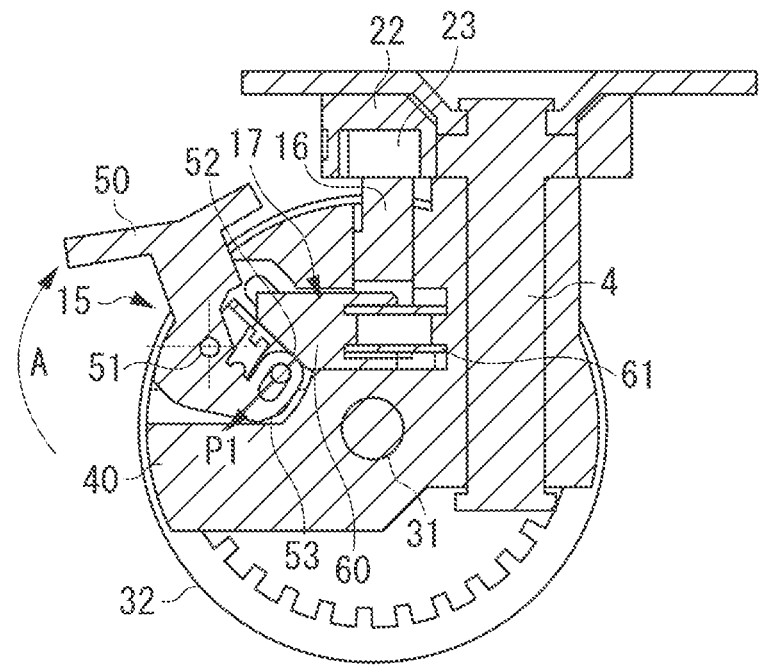
FIGS. 10A and 10B are other diagrams illustrating the state in which the lock mechanism is not in the lock state and the state in which it is in the lock state.
Figure 10B:
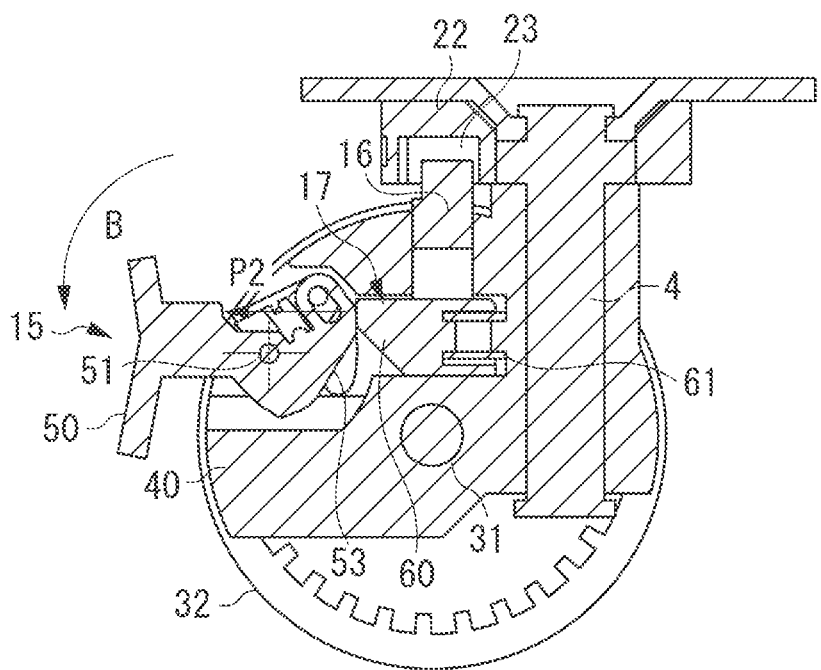

Here, as illustrated in FIG. 10A, when the first contact surface 52 of the operation lever 50 is in contact with the link member 60, the operation lever 50 is urged by the link spring 61 via the link member 60 so as to upwardly swing (in the direction of the arrow A) according to the angle of the first contact surface 52. Further, as illustrated in FIG. 10B, when the second contact surface 53 of the operation lever 50 is in contact with the link member 60, the operation lever 50 is urged by the link spring 61 via the link member 60 so as to downwardly swing (in the direction of the arrow B) according to the angle of the second contact surface 53. As a result, the operation lever 50 is kept in the downwardly swung state, i.e., at the rotation lock position where the rotating portion 11 of the caster 2 is locked, with the result that the lock by the rotation lock member 16 is maintained.

When, in order to release the lock of the rotating portion 11, the operation lever 50 is raised and swung clockwise, the link member 60 is restored to the horizontal state in the outer peripheral direction by the link spring 61. When the link member 60 is thus restored, the rotation lock member 16 moves downwards while the link shaft portion 71 is pulled in by the link groove 62, with the result that the lock of the rotating portion 11 by the rotation lock member 16 is released. In this way, through the pushing-down and raising of the operation lever portion 15, the rotation lock member 16 can perform the operation of protruding or retracting from the caster base 40 via the link portion 17, making it possible to lock and unlock the rotating portion 11.

Figure 11A:
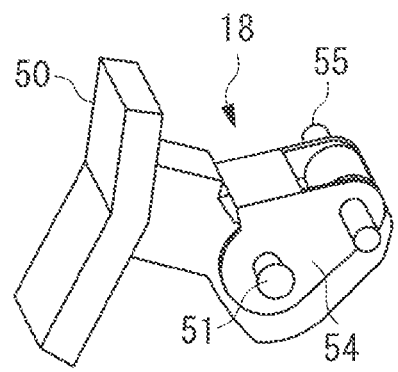
FIGS. 11A, 11B, and 11C are diagrams illustrating the construction of a rotation lock mechanism provided in the caster.
Figure 11B:
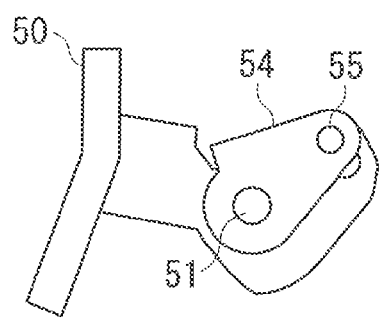
Figure 11C:
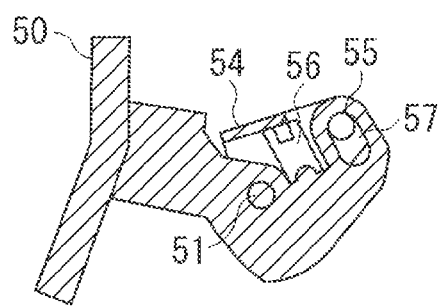

FIGS. 11A, 11B, and 11C are diagrams illustrating the construction of the rotation lock mechanism 18. The rotation lock mechanism 18 has the uniform wheel protrusions and recesses 34 described above that are formed on the inner side of the outer periphery of the wheel 32, and a rotation lock base 54 illustrated in FIG. 11A. This rotation lock base 54 is equipped with a rotation lock shaft 55 detachably engaged with the wheel protrusions and recesses 34, and, as illustrated in FIG. 11B, is swingably (movably) supported by the operation lever 50 using the operation lever rotation shaft 51 as the fulcrum. Further, as illustrated in FIG. 11C, between the operation lever 50 and the operation lock base 54, there is provided a rotation lock urging spring 56 which is an elastic member configured to urge the rotation lock base 54 away from the operation lever 50.

Here, as illustrated in FIG. 11C, the operation lever 50 has a swinging regulation hole 57, and the rotation lock shaft 55 is retained integrally by the operation lever 50 while outwardly protruding from the swinging regulation hole 57. As a result, the rotation lock base 54 and the rotation lock shaft 54 swing within the range of the swinging regulation hole 57. FIGS. 11A, 11B, and 11C illustrate a state in which the operation lever 50 and the rotation lock mechanism 18 are not locked. At this time, the rotation lock base 54 is at rest, with the rotation lock shaft 55 being held in press contact with the upper end of the swinging regulation hole 57 by the rotation lock urging spring 56.

Figure 12A:
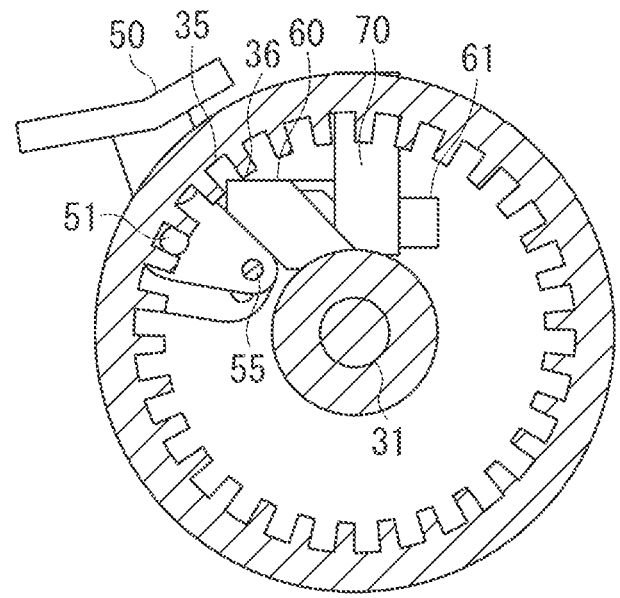
FIGS. 12A and 12B are diagrams illustrating the lock operation when a rotation lock shaft of the rotation lock mechanism and protrusions and recesses of the wheel are in phase with each other.
Figure 12B:
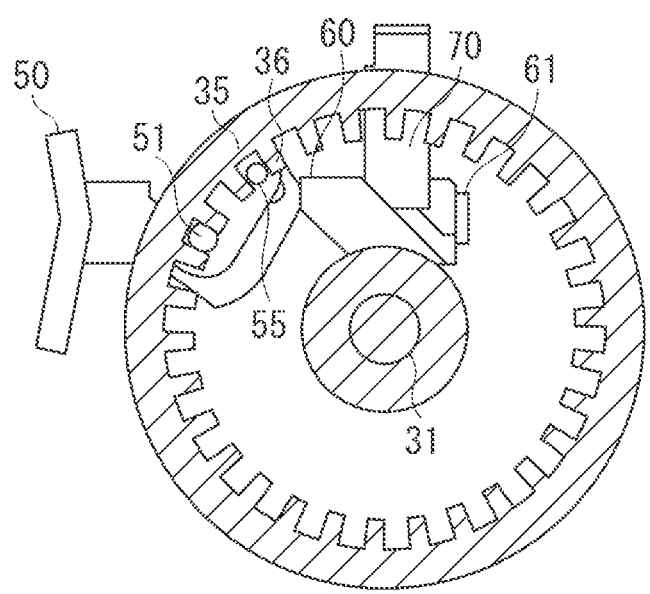

When locking the wheel 32, the operation lever 50 at the position as illustrated in FIG. 12A is pushed down counterclockwise. Here, when the rotation lock shaft 55 and the wheel protrusions and recesses 34 are in phase with each other, the operation lever portion 15 swings around the operation lever rotation shaft 51 with the operation of pushing down the operation lever 50 as illustrated in FIG. 12B. As a result, the rotation lock shaft 55 is engaged with the wheel recess 35 of the wheel protrusions and recesses 34, making it possible to lock the wheel 32.

As illustrated in FIG. 12B, by thus pushing down the operation lever 50, the rotation lock member 16 protrudes upwards, so that the rotation lock by the rotation lock member 16 is also completed. That is, in the case where the rotation lock member 55 and the wheel protrusions and recesses 34 are in phase with each other, when the operation lever 50 is pushed down, it is possible to lock the wheel 32. At the same time, it is also possible to lock the rotating portion 11.

Figure 13A:
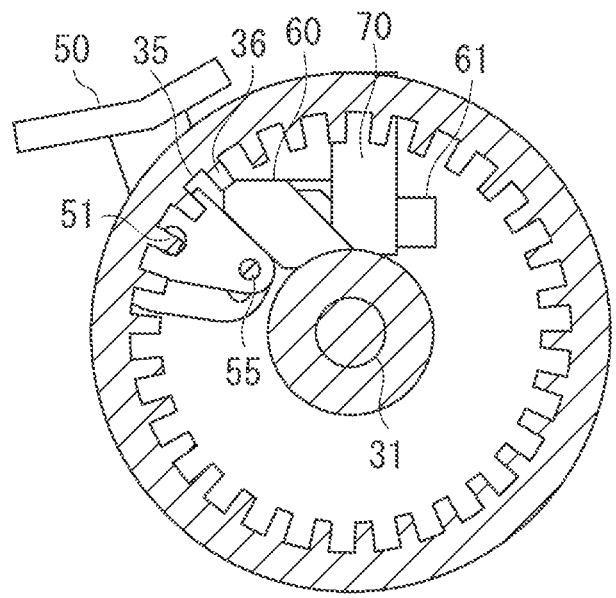
FIGS. 13A and 13B are diagrams illustrating the lock operation when the rotation lock shaft of the rotation lock mechanism and the protrusions and recesses of the wheel are not in phase with each other.
Figure 13B:
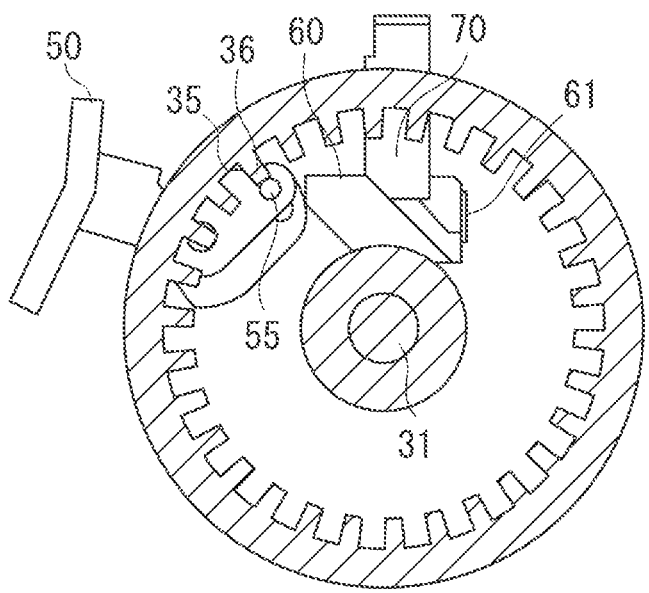

On the other hand, in the case where, as illustrated in FIG. 13A, the rotation lock shaft 55 and the wheel protrusions and recesses 34 are not in phase with each other, when the operation lever 50 is pushed down, the rotation lock shaft 55 and the wheel protrusion 36 of the wheel protrusions and recesses 34 are brought into contact with each other. As illustrated in FIG. 13B, in this case, even when the operation lever 50 is pushed down, it is impossible to engage the rotation lock shaft 55 with the wheel protrusions and recesses 34, so that it is impossible to lock the wheel 32.

Figure 14A:
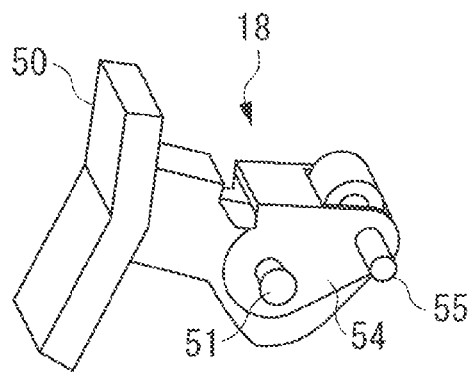
FIGS. 14A, 14B, and 14C are diagrams illustrating the operation of a rotation lock base and the rotation lock shaft when an operation lever is pushed down in the state in which the rotation lock shaft and the protrusions and recesses of the wheel are not in phase with each other.
Figure 14B:
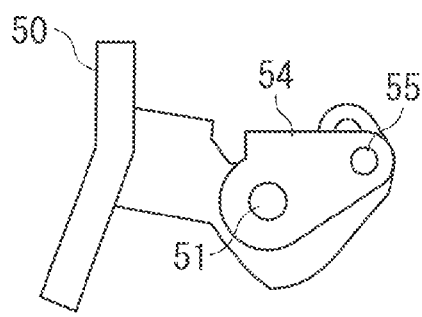
Figure 14C:
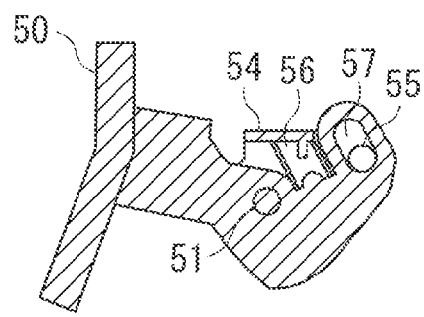

However, when, in this state, the operation lever 50 is further pushed down, the rotation lock shaft 55 moves, together with the rotation lock base 54, downwardly along the swinging regulation hole 57 while compressing (deforming) the rotation lock urging spring 56 as illustrated in FIGS. 14A through 14C. As a result, it is possible to push down the operation lever 50 separately from the rotation lock base 54. As a result, it is possible to upwardly protrude the rotation lock member 16, making it possible to lock the rotating portion 11.

That is, in the case where the rotation lock shaft 55 and the wheel protrusions and recesses 34 are not in phase with each other, when the operation lever 50 is pushed down, the rotation lock urging spring 56 is compressed, whereby it is possible to push down the operation lever 50 separately from the rotation lock base 54. As a result, although it is impossible to lock the wheel 32, it is possible to lock the rotating portion 11.

Figure 15:
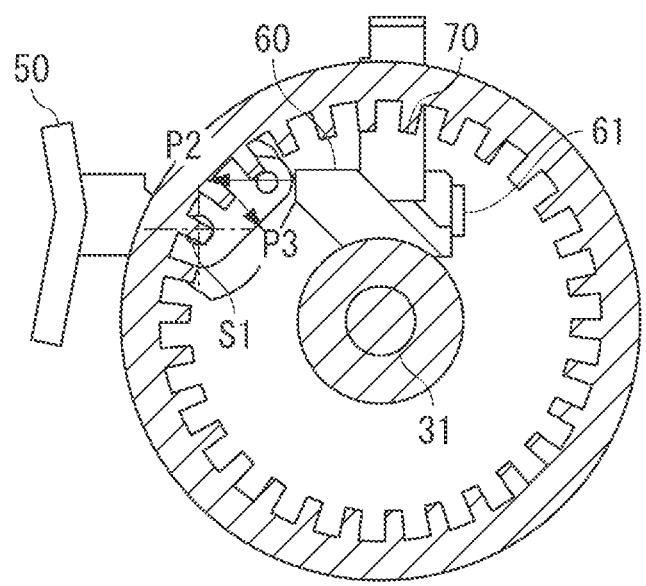
FIG. 15 is a diagram illustrating the force relationship when the operation lever is placed in the lock position in the state in which the rotation lock shaft and the protrusions and recesses of the wheel are not in phase with each other.

As illustrated in FIG. 10B referred to above, when the operation lever 50 is further pushed down, the second contact surface 53 of the operation lever 50 comes into contact with the link member 60. At this time, as illustrated in FIG. 15, the operation lever 50 is urged clockwise by the urging force (restoring force) P3 due to the rotation lock urging spring 56. Further, as illustrated in FIG. 10B, the operation lever 50 is urged counterclockwise by the urging force P2 due to the link spring 61 via the link member 60.

Here, in the present exemplary embodiment, with regard to the moment of the operation lever 50 around the operation lever rotation shaft 51, the spring force is set such that the moment due to the force P2 is larger than the moment due to the force P3. As a result, even if the rotation lock urging spring 56 is provided between the operation lever 50 and the rotation lock base 54, it is possible to prevent the operation lever 50 from being restored to the state of FIG. 13A due to the urging force P3 of the rotation lock urging spring 56 when the user releases the operation lever. Since the operation lever 50 is not restored to the former state even if the user releases it, it is possible to complete the rotation lock even when the rotation lock shaft 55 and the wheel protrusions and recesses 34 are not in phase with each other.

Further, even if the rotation lock shaft 55 and the wheel protrusions and recesses 34 are not in phase with each other, the rotation lock base 54 is urged in the direction of the outer periphery, i.e., toward the wheel protrusion 36, due to the reaction force of the urging force P3 of the rotation lock urging spring 56. Thus, when the wheel 32 is slightly rotated from the state of FIG. 15, the rotation lock shaft 55 and the wheel protrusions and recesses 34 are matched in phase, and the state illustrated in FIG. 13B, that is, the state in which the rotation lock has also been completed.

In this way, even in the state in which the rotation lock is not in phase, when the wheel 32 slightly rotates, rotation lock is effected, so that, in the case where the wheel 32 is not locked, it is only necessary to slightly rotate the wheel 32. Thus, it is possible to perform rotation lock without having to effect phase matching of the rotation lock, which is hard to recognize from the outside.

Figure 16:
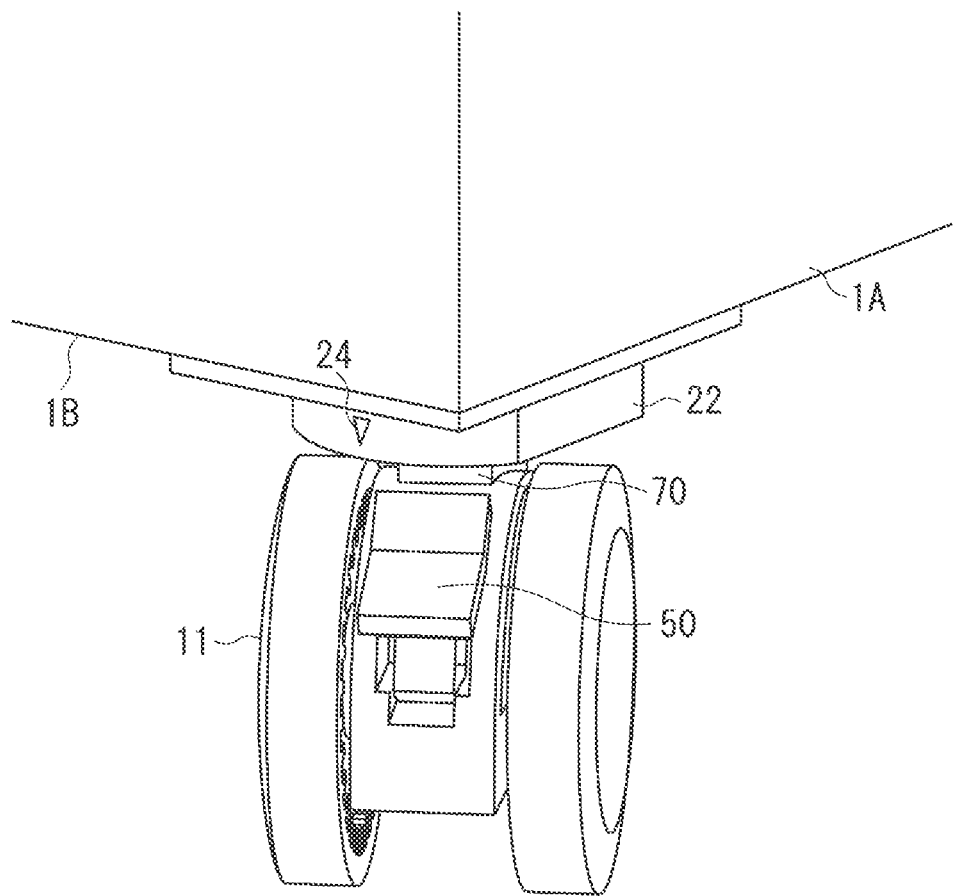
FIG. 16 is a diagram illustrating a state in which the rotation lock of the lock mechanism is not in phase.
Figure 17:
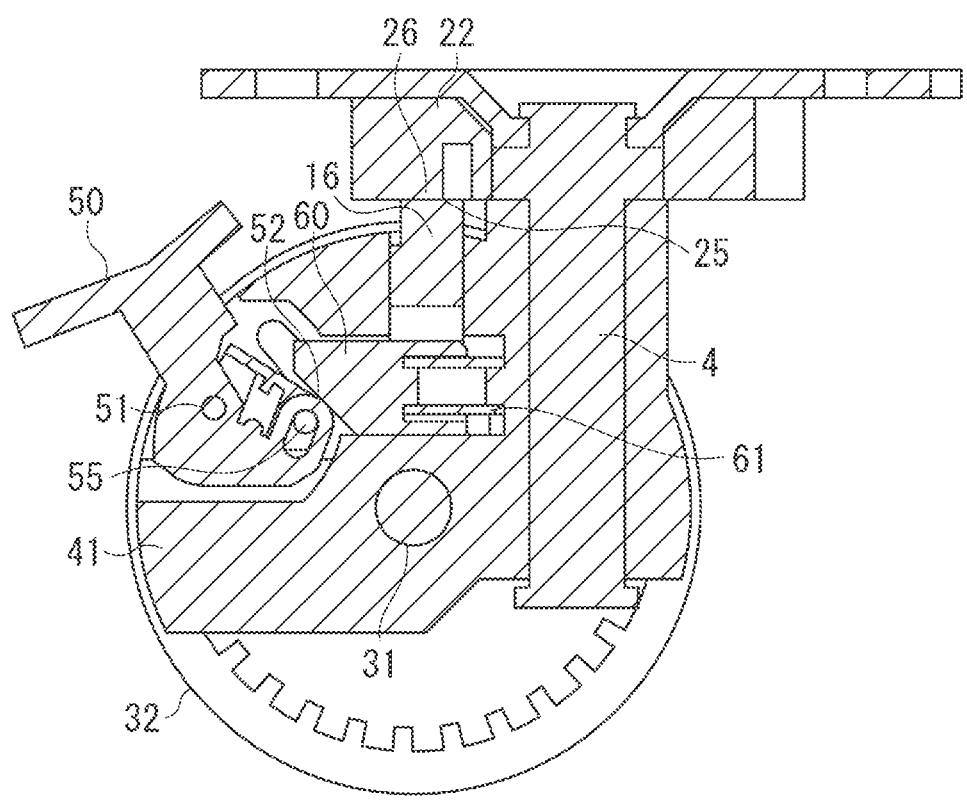
FIG. 17 is a diagram illustrating a state in which the operation lever is operated in the state in which the rotation lock of the lock mechanism is not in phase.

Next, to be described will be the rotation lock operation in the case where the rotation lock member 16 and the rotation lock reception member 22 are not in phase with each other. FIG. 16 illustrates the state in which the rotation lock member 16 and the rotation lock reception member 22 are not in phase with each other. In this case, when the operation lever 50 is pushed down, the rotation lock member 16 ascends. However, since the rotation lock member 16 and the rotation lock reception member 22 are not in phase with each other, the upper end portion 26 of the rotation lock member 16 interferes with a flat portion 25 of the rotation lock reception member 22 as illustrated in FIG. 17.

As a result, it is impossible to further lower the operation lever 50. Further, in this state, the first contact surface 52 of the operation lever 50 is in contact with the link member 60, so that the operation lever 50 is urged clockwise by the link spring 61. Thus, when the user releases the operation lever 50 in this state, the operation lever 50 is restored to the former, raised state.

However, as illustrated in FIG. 16, the rotation lock reception member 22 is, as described above, provided with the triangular indicator 24 for indicating the existence of the rotation lock recess 23. Thus, when it is impossible to lower the operation lever 50, the user rotates the rotating portion 11 such that the operation lever 50 is matched with the triangular indicator 24. The triangular indicator 24 can be recognized from the outside, so that the user can easily match the phase of the operation lever 50 with that of the triangular indicator 24.

By matching the phase of the operation lever 50 with that of the triangular indicator 24, it is possible to push the operation lever 50 down to the rotation lock position, making it possible to effect rotation lock. That is, in the present exemplary embodiment, when the phase of the operation lever 50 is matched with that of the triangular indicator 24, it is possible to push the operation lever down to the rotation lock position, thus making it possible to effect rotation lock.

When it is thus possible to push the operation lever 50 down to a position where rotation lock is possible, it is possible for the user to complete the operation of the operation lever 50 without experience any stress even in a state in which the rotation lock is not in phase. Further, since it is possible to thus push down the operation lever 50, it is possible to effect rotation lock when the wheel 32 slightly rotates thereafter even in the state in which the rotation lock is not in phase.

As described above, in the present exemplary embodiment, the rotation lock urging spring 56 is provided between the operation lever 50 and the rotation lock mechanism 18. When the operation lever 50 is operated in the state in which the rotation lock is not in phase, it is possible to move the operation lever 50 to the rotation lock position through deformation of the rotation lock urging spring 56. As a result, solely by setting the rotation lock in phase, it is possible to move the operation lever 50 to the rotation lock position, making it possible to lock the caster 2 (i.e. the rotating portion 11 thereof) even in the case where the wheel is not locked.

Further, by slightly rotating the wheel 32 after thus locking the rotating portion 11, it is possible to immediately lock the wheel 32, so that, even in the state in which the rotation lock is not in phase, it is possible to easily lock the wheel 32. As a result, it is possible to achieve an improvement in terms of usability, and to prevent the image forming apparatus 1 from being allowed to move in advertently.

Figure 18:
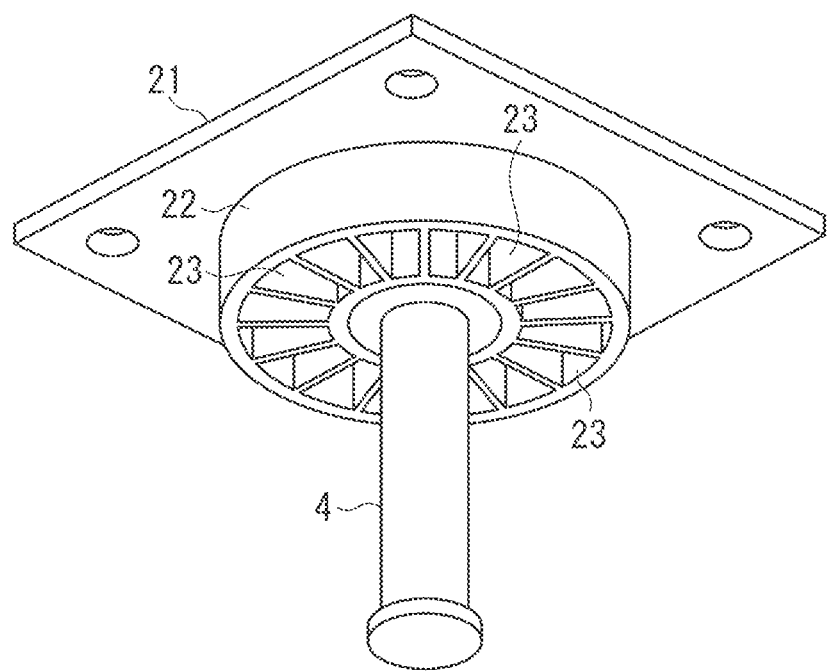
FIG. 18 is a diagram illustrating another construction of the lock mechanism.

While in the example described above a single lock recess 23 is formed in the rotation lock reception portion 22, this should not be construed restrictively. For example, as illustrated in FIG. 18, it is also possible to form a plurality of rotation lock recesses 23 in the bottom surface of the rotation lock reception member 22 so as to arrange them along the rotation path of the rotating portion 11. By thus forming a plurality of rotation lock recesses 23, it is possible to lock the rotating portion 11 of the caster 2 at an arbitrary position. As a result, it is possible, for example, in a case where there are limitations in the installation space for the image forming apparatus, to select a caster rotational position where the highest level of safety is attained under the installation condition for the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-261191 filed Nov. 29, 2012, which is hereby incorporated by reference herein in its entirety.

What is claimed is:

1. An image forming apparatus comprising:
an image forming apparatus main body; and
a plurality of casters mounted to a bottom surface of the image forming apparatus main body so as to be rotatable parallel to the bottom surface,
wherein at least one of the casters including:
a retaining portion fixed to the bottom surface of the image forming apparatus main body;
a caster main body rotatably retained by the retaining portion;
a wheel rotatably retained by the caster main body;
a first lock mechanism which is provided on a first engaged portion formed on the retaining portion and on the caster main body, which has a first engaging portion configured to be detachably engaged with the first engaged portion, and which is configured to fix the caster main body in position with the first engaging portion being engaged with the first engaged portion so as to be in phase with each other;
a second lock mechanism which is provided on a second engaged portion formed on an inner peripheral surface of the wheel and on the caster main body, which has a second engaging portion configured to be detachably engaged with the second engaged portion, and which is configured to fix the wheel in position with the second engaging portion being engaged with the second engaged portion so as to be in phase with each other;
an operation lever for fixing the caster main body in position by the first lock mechanism and releasing the fixation thereof and for fixing the wheel in position by the second lock mechanism and releasing the fixation thereof; and
an elastic member which is provided between the operation lever and the second lock mechanism and which is configured to undergo deformation so as to enable the operation lever to move to a rotation lock position allowing engagement of the first engaging portion with the first engaged portion even when a fixing operation is performed on the operation lever in a state in which the second engaged portion and the second engaging portion are not in phase with each other.

2. The image forming apparatus according to claim 1, wherein when the phase of the second engaged portion and that of the second engaging portion match each other in the state in which the caster main body is fixed in position by the first lock mechanism, the first engaging portion is engaged with the first engaged portion due to a restoring force of the elastic member.

3. The image forming apparatus according to claim 1, wherein the second engaging portion is movably provided on the operation lever, and
   wherein the elastic member is arranged between the operation lever and the second engaging portion.

4. The image forming apparatus according to claim 1, wherein said at least one of the casters further includes:
   a link portion configured to move the first engaging portion in conjunction with the operation of the operation lever; and
   an urging member configured to hold the link portion in press contact with the operation lever and to urge, when the operation lever moves to the rotation lock position, the operation lever so as to retain the operation lever at the rotation lock position, and
   wherein the urging force of the urging member retaining the operation lever at the rotation lock position is larger than a force applied to the operation lever by the deformed elastic member.

5. The image forming apparatus according to claim 1, wherein the first engaged portion includes a plurality of first engaged portions arranged on the retaining portion along the rotation path of the caster main body.

6. The image forming apparatus according to claim 1, wherein the retaining portion includes an indicating portion indicating the position of the first engaged portion.

\* \* \* \* \*